United States Patent
Durairaj et al.

(10) Patent No.: US 12,101,281 B2
(45) Date of Patent: Sep. 24, 2024

(54) TECHNOLOGIES FOR ASYNCHRONOUSLY RESTORING AN INCOMPLETE CO-BROWSE SESSION

(71) Applicant: Genesys Cloud Services, Inc., Menlo Park, CA (US)

(72) Inventors: Asmitha Durairaj, Chennai (IN); Monisha Padmavathi Ragavan, Chennai (IN); Santhos Palani Vell Rajan Manickam, Chennai (IN); Vinoth Subramaniam, Chennai (IN); Mohamed Uvaiz Anwar Batcha, Chennai (IN); Praveen Kumar Anandadoss, Chennai (IN); Tony Thazhekkaden, Chennai (IN)

(73) Assignee: Genesys Cloud Services, Inc., Menlo Park, CA (US)

( * ) Notice: Subject to any disclaimer, the term of this patent is extended or adjusted under 35 U.S.C. 154(b) by 0 days.

(21) Appl. No.: 17/874,887

(22) Filed: Jul. 27, 2022

(65) Prior Publication Data
US 2024/0039873 A1    Feb. 1, 2024

(51) Int. Cl.
*H04L 51/02* (2022.01)

(52) U.S. Cl.
CPC .................................. *H04L 51/02* (2013.01)

(58) Field of Classification Search
CPC ................................ H04L 51/02; H04L 51/04
See application file for complete search history.

(56) References Cited

U.S. PATENT DOCUMENTS

| | | | |
|---|---|---|---|
| 7,941,755 B2 | 5/2011 | Siegrist et al. | |
| 8,190,670 B2 | 5/2012 | Gavrilescu et al. | |
| 8,849,914 B2 | 9/2014 | Bove et al. | |
| 10,750,019 B1 | 8/2020 | Petrovykh et al. | |
| 11,121,987 B1 * | 9/2021 | Schlicht | H04L 51/02 |
| 2015/0066479 A1 | 3/2015 | Pasupalak et al. | |
| 2016/0162474 A1 | 6/2016 | Agarwal et al. | |
| 2017/0032027 A1 | 2/2017 | Mauro et al. | |

(Continued)

OTHER PUBLICATIONS

GENESYS; Genesys Multicloud CX; last accessed Jul. 18, 2022; 11 pages; available at https://www.genesys.com/genesys-multicloud-cx.

(Continued)

*Primary Examiner* — Soe Hlaing
(74) *Attorney, Agent, or Firm* — Taft Stettinius & Hollister LLP

(57) ABSTRACT

A method of asynchronously restoring an incomplete co-browse session according to an embodiment includes initiating an interaction between a user and a chat bot, determining whether data indicative of an incomplete co-browse session is stored in association with a user in response to initiating the interaction between the user and the chat bot, retrieving an intent configuration file associated with the incomplete co-browse session, wherein the intent configuration file defines a plurality of actions to be executed by the chat bot to resolve a user intent of the interaction between the user and the chat bot, and performing, via the chat bot and during a resumed co-browse session with the user, one or more actions of the plurality of actions defined by the intent configuration file that were not previously performed during the incomplete co-browse session.

19 Claims, 14 Drawing Sheets

(56) References Cited

U.S. PATENT DOCUMENTS

2017/0235740 A1    8/2017  Seth et al.
2018/0096686 A1*  4/2018  Borsutsky ............... G10L 15/22

OTHER PUBLICATIONS

International Search Report and Written Opinion of the International Searching Authority; ISA/US; International Application No. PCT/US2023/071089; Sep. 29, 2023; 14 pages.
International Search Report and Written Opinion of the International Searching Authority; ISA/US; International Application No. PCT/US2023/071092; Nov. 9, 2023; 8 pages.

* cited by examiner

1000

⋮

Yes, can you do that for me?

Okay. I have filled out your form with the details I have. Please go ahead and complete the rest. And if you have any questions, please let me know.

How can I link my account to Market funds?

You have to first choose the "Yes" option for the Market Funds link field that is highlighted here. Then click the "Buy New Stocks" button and select the stocks in which you want to invest.

Let me add a few stocks.

Please click on the "Verify and Submit" button to finalize and submit your application.

~~ Customer submits the application ~~

Thanks for giving us an opportunity to assist you today.

~~ Conversation ends ~~

I approve you with write permission.

Okay. I have filled out your form with the details I already have. Please go ahead and fill out the rest. And if you have any questions, please let me know.

Is there an option to invest some amount in Market Funds?

Yes, we have an option for you to link market funds to your Account. Here is how.
    You have to first chose the "Yes" option for the Market Funds link field that is highlighted here.
    Then click the "Link Market Funds" button and select the Funds in which you want to invest.

Let me pick some funds.

~~ Co-browse session disconnected ~~

~~ Customer initiates a new session ~~

Hi, I am Cicero, your personal Bank assistant.

I could see your previous co-browse interaction for Senior Bank Account creation is incomplete. If you wish to continue the same, please respond with "Yes". *(By responding with "Yes" you are accepting to co-browse with the Bot with write permission)*

Yes

> Thanks, I will restore the session that we were working on during the previous visit.

~~ Co-browse session restored ~~

> Here we are at the "Link Some Market Funds" page. We can continue the co-browse session from here.

Yes, I wanted to link some of the Market funds from my application.

> You have to click on the "Link Market Funds" field that is highlighted here. Select the fund you wish to add by clicking "Add Funds" and click "Save".

I am done adding the funds.

> Are you ready to submit the application now?

Yes, I am.

> Please click on the "Verify and Submit" button to finalize and submit your application.

~~ Customer submits the application ~~

> Thanks for giving us an opportunity to assist you today.

~~ Conversation ends ~~

FIG. 14

TECHNOLOGIES FOR ASYNCHRONOUSLY RESTORING AN INCOMPLETE CO-BROWSE SESSION

BACKGROUND

Call centers and other contact centers are used by many organizations to provide technical and other support to their end users. The end user may interact with human and/or virtual agents of the contact center by establishing electronic communications via one or more communication technologies including, for example, telephone, email, web chat, Short Message Service (SMS), dedicated software application(s), and/or other technologies. Contact centers may utilize various types of virtual agents and/or chat bots depending on the particular implementation. In some circumstances, contact centers allow for interactions to be transferred to human agents if virtual agents and/or chat bots are unable to assist the user.

SUMMARY

One embodiment is directed to a unique system, components, and methods for co-browse technologies. Other embodiments are directed to apparatuses, systems, devices, hardware, methods, and combinations thereof for co-browse technologies.

According to an embodiment, a method for asynchronously restoring an incomplete co-browse session may include initiating an interaction between a user and a chat bot, determining whether data indicative of an incomplete co-browse session is stored in association with a user in response to initiating the interaction between the user and the chat bot, retrieving an intent configuration file associated with the incomplete co-browse session, wherein the intent configuration file defines a plurality of actions to be executed by the chat bot to resolve a user intent of the interaction between the user and the chat bot, and performing, via the chat bot and during a resumed co-browse session with the user, one or more actions of the plurality of actions defined by the intent configuration file that were not previously performed during the incomplete co-browse session.

In some embodiments, the plurality of actions may include at least one of a mouse movement, mouse interaction, screen pointer, screen change, audio instruction, video instruction, or text entry.

In some embodiments, the intent configuration file may define a sequence of the plurality of actions to be executed by the chat bot to resolve the user intent.

In some embodiments, determining whether data indicative of an incomplete co-browse session is stored in associated with the user may include determining a unique identifier associated with the user and comparing the unique identifier to a co-browse action database.

In some embodiments, the plurality of actions may include a plurality of web actions involving interactions with one or more web pages.

In some embodiments, the method may further include providing, via the chat bot, the user with an option to resume the incomplete co-browse session, and retrieving the intent configuration file associated with the incomplete co-browse session may be in response to receiving an indication that the user indicates to resume the incomplete co-browse session.

In some embodiments, the method may further include determining a point in the intent configuration file at which the incomplete co-browse session was terminated, and performing the one or more actions defined by the intent configuration file may include performing actions defined by the intent configuration file starting at the point in the intent configuration file at which the incomplete co-browse session was terminated.

In some embodiments, the method may further include storing the one or more actions performed by the chat bot during the resumed co-browse session to a co-browse action database.

According to another embodiment, a system for asynchronously restoring an incomplete co-browse session may include at least one processor and at least one memory comprising a plurality of instructions stored thereon that, in response to execution by the at least one processor, causes the system to initiate an interaction between a user and a chat bot, determine whether data indicative of an incomplete co-browse session is stored in association with a user in response to initiating the interaction between the user and the chat bot, retrieve an intent configuration file associated with the incomplete co-browse session, wherein the intent configuration file defines a plurality of actions to be executed by the chat bot to resolve a user intent of the interaction between the user and the chat bot, and perform, via the chat bot and during a resumed co-browse session with the user, one or more actions of the plurality of actions defined by the intent configuration file that were not previously performed during the incomplete co-browse session.

In some embodiments, the plurality of actions may include at least one of a mouse movement, mouse interaction, screen pointer, screen change, audio instruction, video instruction, or text entry.

In some embodiments, the intent configuration file may define a sequence of the plurality of actions to be executed by the chat bot to resolve the user intent.

In some embodiments, to determine whether data indicative of an incomplete co-browse session is stored in associated with the user may include to determine a unique identifier associated with the user, and compare the unique identifier to a co-browse action database.

In some embodiments, the plurality of actions may include a plurality of web actions involving interactions with one or more web pages.

In some embodiments, the plurality of instructions may further cause the system to provide, via the chat bot, the user with an option to resume the incomplete co-browse session, and to retrieve the intent configuration file associated with the incomplete co-browse session may be in response to receiving an indication that the user indicates to resume the incomplete co-browse session.

In some embodiments, the plurality of instructions may further cause the system to determine a point in the intent configuration file at which the incomplete co-browse session was terminated, and to perform the one or more actions defined by the intent configuration file may include to perform actions defined by the intent configuration file starting at the point in the intent configuration file at which the incomplete co-browse session was terminated.

In some embodiments, the plurality of instructions may further cause the system to store the one or more actions performed by the chat bot during the resumed co-browse session to a co-browse action database.

According to yet another embodiment, one or more non-transitory machine readable storage media may include a plurality of instructions stored thereon that, in response to execution by a system, causes the system to initiate an interaction between a user and a chat bot, determine whether data indicative of an incomplete co-browse session is stored in association with a user in response to initiating the interaction between the user and the chat bot, retrieve an intent configuration file associated with the incomplete co-browse session, wherein the intent configuration file defines a plurality of actions to be executed by the chat bot to resolve a user intent of the interaction between the user and the chat bot, and perform, via the chat bot and during a resumed co-browse session with the user, one or more actions of the plurality of actions defined by the intent configuration file that were not previously performed during the incomplete co-browse session.

In some embodiments, the plurality of instructions may further cause the system to provide, via the chat bot, the user with an option to resume the incomplete co-browse session, and to retrieve the intent configuration file associated with the incomplete co-browse session may be in response to receiving an indication that the user indicates to resume the incomplete co-browse session.

In some embodiments, the plurality of instructions may further cause the system to determine a point in the intent configuration file at which the incomplete co-browse session was terminated, and to perform the one or more actions defined by the intent configuration file may include to perform actions defined by the intent configuration file starting at the point in the intent configuration file at which the incomplete co-browse session was terminated.

In some embodiments, the plurality of instructions may further cause the system to store the one or more actions performed by the chat bot during the resumed co-browse session to a co-browse action database.

According to another embodiment, a method of self-learning actions for an automated co-browse session may include initiating an interaction between a user and a chat bot, determining a user intent of the user based on the interaction between the user and the chat bot, routing the interaction to a human contact center agent for a co-browse session between the user and the human contact center agent, storing a plurality of actions performed by the human contact center agent during the co-browse session to a data store, and performing machine learning to determine an optimal solution for resolving the user intent based on an analysis of the plurality of actions performed by the human contact center agent during the co-browse session.

In some embodiments, the method may further include generating an intent configuration file for the optimal solution based on the machine learning, wherein the intent configuration file defines a sequence of actions to be executed by the chat bot in an automated co-browse session between the chat bot and another user to resolve the user intent, and storing the intent configuration file in association with the user intent.

In some embodiments, the method may include determining a confidence score indicative of a confidence of the system in the optimal solution based on the machine learning, and generating the intent configuration file for the optimal solution may include generating the intent configuration file for the optimal solution in response to determining that the confidence score exceeds a threshold confidence level.

In some embodiments, the sequence of actions may include one or more actions of the plurality of actions performed by the human contact center agent during the co-browse session.

In some embodiments, performing the machine learning may include analyzing a plurality of sequences of actions performed by human contact center agents during respective co-browse sessions to resolve the user intent.

In some embodiments, analyzing the plurality of sequences of actions performed by the human contact center agents during the corresponding co-browse sessions to resolve the user intent may include applying a Q-learning reinforcement algorithm to the plurality of sequences of actions performed by the human contact center agents during the corresponding co-browse sessions to resolve the user intent.

In some embodiments, the optimal solution may be selected from the plurality of sequences of actions performed by the human contact center agents during the corresponding co-browse sessions to resolve the user intent.

In some embodiments, the plurality of actions may include at least one of a mouse movement, mouse interaction, screen pointer, screen change, audio instruction, video instruction, or text entry.

In some embodiments, the plurality of actions may include a plurality of web actions involving interactions with one or more web pages.

According to yet another embodiment, a system of self-learning actions for an automated co-browse session may include at least one processor and at least one memory comprising a plurality of instructions stored thereon that, in response to execution by the at least one processor, causes the system to initiate an interaction between a user and a chat bot, determine a user intent of the user based on the interaction between the user and the chat bot, route the interaction to a human contact center agent for a co-browse session between the user and the human contact center agent, store a plurality of actions performed by the human contact center agent during the co-browse session to a data store, and perform machine learning to determine an optimal solution for resolving the user intent based on an analysis of the plurality of actions performed by the human contact center agent during the co-browse session.

In some embodiments, the plurality of instructions may further cause the system to generate an intent configuration file for the optimal solution based on the machine learning, wherein the intent configuration file defines a sequence of actions to be executed by the chat bot in an automated co-browse session between the chat bot and another user to resolve the user intent, and store the intent configuration file in association with the user intent.

In some embodiments, the plurality of instructions may further cause the system to determine a confidence score indicative of a confidence of the system in the optimal solution based on the machine learning, and to generate the intent configuration file for the optimal solution may include to generate the intent configuration file for the optimal solution in response to a determination that the confidence score exceeds a threshold confidence level.

In some embodiments, to perform the machine learning may include to analyze a plurality of sequences of actions performed by human contact center agents during respective co-browse sessions to resolve the user intent.

In some embodiments, to analyze the plurality of sequences of actions performed by the human contact center agents during the corresponding co-browse sessions to resolve the user intent may include to apply a Q-learning reinforcement algorithm to the plurality of sequences of actions performed by the human contact center agents during the corresponding co-browse sessions to resolve the user intent.

In some embodiments, the optimal solution may be selected from the plurality of sequences of actions performed by the human contact center agents during the corresponding co-browse sessions to resolve the user intent.

According to another embodiment, one or more non-transitory machine readable storage media may include a plurality of instructions stored thereon that, in response to execution by a system, causes the system to initiate an interaction between a user and a chat bot, determine a user intent of the user based on the interaction between the user and the chat bot, route the interaction to a human contact center agent for a co-browse session between the user and the human contact center agent, store a plurality of actions performed by the human contact center agent during the co-browse session to a data store, and perform machine learning to determine an optimal solution for resolving the user intent based on an analysis of the plurality of actions performed by the human contact center agent during the co-browse session.

In some embodiments, the plurality of instructions may further cause the system to generate an intent configuration file for the optimal solution based on the machine learning, wherein the intent configuration file defines a sequence of actions to be executed by the chat bot in an automated co-browse session between the chat bot and another user to resolve the user intent, and store the intent configuration file in association with the user intent.

In some embodiments, the plurality of instructions may further cause the system to determine a confidence score indicative of a confidence of the system in the optimal solution based on the machine learning, and to generate the intent configuration file for the optimal solution may include to generate the intent configuration file for the optimal solution in response to a determination that the confidence score exceeds a threshold confidence level.

In some embodiments, to perform the machine learning may include to analyze a plurality of sequences of actions performed by human contact center agents during respective co-browse sessions to resolve the user intent.

In some embodiments, to analyze the plurality of sequences of actions performed by the human contact center agents during the corresponding co-browse sessions to resolve the user intent may include to apply a Q-learning reinforcement algorithm to the plurality of sequences of actions performed by the human contact center agents during the corresponding co-browse sessions to resolve the user intent.

In some embodiments, the optimal solution may be selected from the plurality of sequences of actions performed by the human contact center agents during the corresponding co-browse sessions to resolve the user intent.

In some embodiments, to route the interaction to the human contact center agent for a co-browse session between the user and the human contact center agent may include to route the interaction to the human contact center agent in response to a determination that the chat bot is unable to resolve the user intent of the user.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIGS. 10-11 are an example interaction between a user and a chat bot that illustrates at least one embodiment of the method of FIG. 5; and FIGS. 12-14 are an example interaction between a user and a chat bot that illustrates at least one embodiment of the method of FIGS. 6-7.

DETAILED DESCRIPTION

Figure 1:
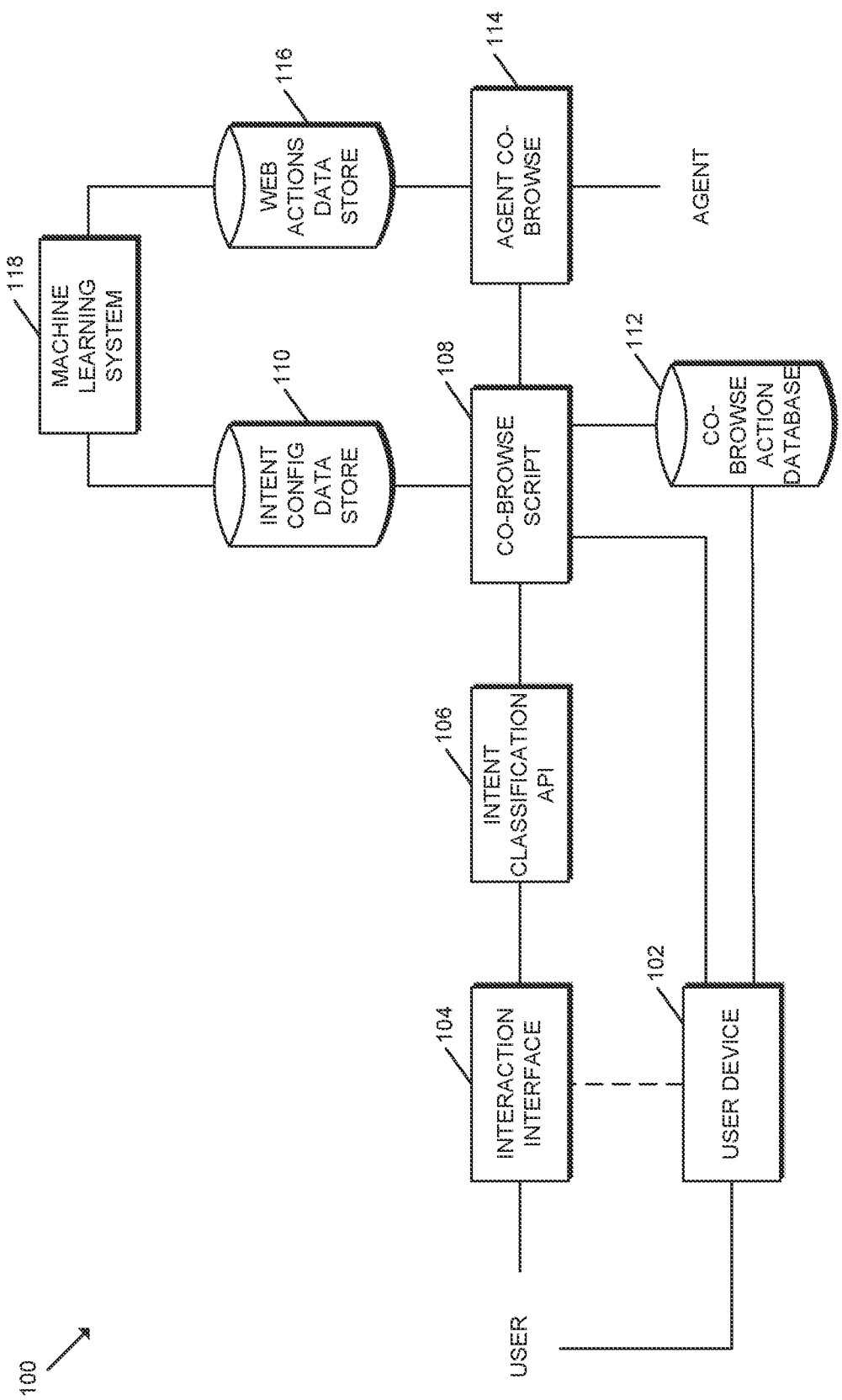
FIG. 1 depicts a simplified block diagram of at least one embodiment of a system for co-browsing using chat bots by leveraging artificial intelligence and asynchronous session handling.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, a system 100 for co-browsing by chat bots by leveraging artificial intelligence (AI) and asynchronous session handling is shown. As described in greater detail below, the system 100 enables voice and chat bots to be used in conjunction with co-browse technologies and provides for the ability of AI-powered bots to handle co-browse sessions without the help of a human agent in a contact center system, thereby reducing the agent workload, reducing customer wait times, and providing improved customer service. For example, the system 100 may identify the customer/user intents from an interaction or conversation with the user and detect whether the user will need (or could benefit from) a co-browse session using artificial intelligence. If so, the chat bot may proactively offer the user an opportunity to participate in a co-browse session, and upon user consent, the chat bot may automatically perform a set of desired actions (e.g., web actions) on a webpage with which the user is interacting through embedded JavaScript and/or other technologies. The relevant set of desired actions may be selected based, for example, on the user intent determined by the system. It should be appreciated that the term "chat bot" is used throughout the disclosure for simplicity and brevity of the description. However, a "voice bot" and/or other type of automated agent may be used in other embodiments. Accordingly, each reference to a "chat bot" is to be interpreted as being inclusive of a "voice bot" and/or other type of automated agent unless expressly indicated otherwise.

The system 100 may also enable the asynchronous restoration of an incomplete co-browse session between a user and a chat bot. For example, the user and chat bot may have been engaging in a co-browsing session that was interrupted due to a user disconnection or other circumstances. As such, if the user returns (e.g., with a new session), the system 100 may identify the user and the incomplete co-browse session for that particular user/intent, and provide the user with an opportunity to resume the co-browse session from the point at which the disruption occurred.

Further, in some embodiments, the system 100 may leverage machine learning capabilities to automatically build/generate a configuration file for a co-browse session to be associated with a particular user intent. For example, if there is not already a matching configuration file stored in association with a user intent, the chat bot may seamlessly transfer the session to a human contact center agent, and the system 100 may capture the Document Object Model (DOM) elements of a web page and web actions performed by the agent during the agent-led co-browse session for storage and analysis. The system 100 may further leverage one or more machine learning technologies (e.g., a Q-reinforcement machine learning algorithm) to identify the optimal steps to be performed by a chat bot based on an analysis of multiple agent-led co-browse sessions, and automatically generate a co-browse intent configuration file based on that analysis. As such, the chat bot may subsequently leverage the generated configuration file to automatically handle the co-browse session without the assistance of a human agent.

As shown, in the illustrative embodiment of FIG. 1, the system 100 includes a user device 102, an interaction interface 104, an intent classification application programming interface (API) 106, a co-browse script 108, an intent configuration data store 110, a co-browse action database 112, an agent co-browse system 114, a web actions data store 116, and a machine learning system 118. Although only one user device 102, one interaction interface 104, one intent classification API 106, one co-browse script 108, one intent configuration data store 110, one co-browse action database 112, one agent co-browse system 114, one web actions data store 116, and one machine learning system 118 are shown in the illustrative embodiment of FIG. 1, the system 100 may include multiple user devices 102, interaction interfaces 104, intent classification APIs 106, co-browse scripts 108, intent configuration data stores 110, co-browse action databases 112, agent co-browse systems 114, web actions data stores 116, and/or machine learning systems 118 in other embodiments. For example, in some embodiments, the user may use multiple interaction interfaces 104 (e.g., text-based chat and/or voice interfaces) to interact with a chat bot of the system 100. Further, in some embodiments, one or more of the systems described herein may be excluded from the system 100, one or more of the systems described as being independent may form a portion of another system, and/or one or more of the systems described as forming a portion of another system may be independent. Additionally, FIG. 1 may omit various component-to-component interactions and/or other details for simplicity and brevity of the description. For example, in some embodiments, the user may leverage the interaction interface 104 to interact with a chat bot by using the same user device 102 that will also be used for a co-browse session.

As described herein, a user (e.g., customer) may encounter difficulties in navigating or troubleshooting a webpage or other web-based or software-based solution on a user device 102, which may require a form or other user-enterable content to be supplied by the user, in which case the user may reach out to a contact center system for guidance via an interaction interface 104. The user device 102 may be embodied as any type of device capable of executing an application and otherwise performing the functions described herein. As such, the user device 102 may have various input/output devices with which a user may interact to provide and receive audio, text, video, and/or other forms of data. It should be appreciated that the application may be embodied as any type of application suitable for performing the functions described herein. In particular, in some embodiments, the application may be embodied as a web application, a mobile application (e.g., a smartphone application), a cloud-based application, a thin-client application, and/or another type of application. For example, in some embodiments, application may serve as a client-side interface (e.g., via a web browser) for a web-based application or service.

The interaction interface 104 may be embodied as any device, system, and/or component configured to execute an application to facilitate an interaction between the user and a human agent, personal bot, automated agent, chat bot, and/or other automated system over a suitable communication channel. For example, in some embodiments, the interaction interface 104 enables chat-based and/or voice-based communication with a chat bot or other type of automated agent of the contact center system. Further, in some embodiments, the interaction interface 104 may also enable communications between the user and a human agent via the contact center system. It should be appreciated that, in some embodiments, the user device 102 may also function as, execute, communicate with, and/or otherwise leverage the interaction interface 104 for communication with the chat bot or human agent.

The chat bot may be embodied as any automated service or system capable of using automation to engage with end users and otherwise performing the functions described herein. For example, in some embodiments, the chat bot may operate, for example, as an executable program that can be launched according to demand for the particular chat bot (e.g., by a cloud-based system). In the illustrative embodiment, the chat bot simulates and processes human conversation (either written or spoken), allowing humans to interact with digital devices as if the humans were communicating with another human. Accordingly, it should be appreciated that the chat bot may transmit one or more statements via text-to-speech (TTS) techniques. In some embodiments, the chat bot includes and/or leverages artificial intelligence, adaptive learning, bots, cognitive computing, and/or other automation technologies. In some embodiments, the chat bot may be embodied as or include similar features, characteristics, and/or functionality of the chat bot 318 described in reference to the cloud-bases system 300 of FIG. 3.

The intent classification API 106 may be embodied as any system configured to interact with a cloud-based or other remote system (e.g., the cloud-based system 300 of FIG. 3) to identify the user's intent based on the interaction between the user and the chat bot, and as described below, may provide the user with an option for an automated co-browsing session based on the user intent. For example, where user input is provided as speech from the user/customer, the speech may be transcribed into text by a speech-to-text system (such as a large vocabulary continuous speech recognition or LVCSR system) as part of the parsing by a natural language processing module/system. The transcription may be performed locally on the user device 102, or the speech may be transmitted over a network for conversion to text by a cloud-based or other remote server depending on the particular embodiment. In certain embodiments, for example, the intent inference system may automatically infer the user's intent from the text of the provided input using artificial intelligence or machine learning techniques. Such artificial intelligence techniques may include, for example, identifying one or more keywords from the user input and searching a database of potential intents corresponding to the given keywords. The database of potential intents and the keywords corresponding to the intents may be automatically mined from a collection of historical interaction recordings.

The system 100 may retrieve and execute a co-browse script 108 based on the user's intent as determined via the intent classification API 106. More specifically, in some embodiments, an intent configuration file associated with the determined user intent may be retrieved from the intent configuration data store 110, which may be executed by the co-browse script 108 for the chat bot to automatically complete a co-browse session with the user without intervention or assistance from a human agent. In the illustrative embodiment, the co-browse script 108 includes native JavaScript code embedded into the webpage or web-based application being executed by the user device 102. As described herein, it should be appreciated that each intent configuration file stored in the intent configuration data store 100 may be mapped to a corresponding user intent, and may be retrieved from the intent configuration data store 110 and executed by the co-browse script 108 when there is a matching user intent determined by the intent classification API 106 and the user has authorized a co-browsing session for assistance (e.g., completing a web-based form). Each intent configuration file may include one or more sequences of the various actions (e.g., mouse movements/interactions, screen pointers, screen changes, audio/video instructions, text entry, and/or other actions) to be executed by the chat bot in order to automatically resolve the user intent in a manner similar to how it would be resolved by a human agent. In some embodiments, the chat bot may detect that the user may need assistance based on some criteria (e.g., the user has remained stuck at a particular webpage for at least a threshold period of time while completing a form on the webpage), and proactively offer the user assistance via a co-browse session. In other embodiments, the user herself may proactively request assistance for a co-browse session with the bot and engage in the co-browse session. In some embodiments, the chat bot may require access to personal and/or user-specific information in order to execute the relevant co-browse session, in which case the chat bot may retrieve the relevant data from a corresponding user database and/or data structure. Alternatively, the chat bot may request the data directly from the user during the co-browse session.

In some circumstances, the co-browse session between the user and the chat bot may dropped, disconnected, paused, or otherwise disrupted. Accordingly, the system 100 allows for the asynchronous resumption of incomplete (e.g., partially completed) co-browse sessions, such that the user can resume their previous incomplete co-browse session with the chat bot from the point in time of the disruption. In order to facilitate resuming the incomplete co-browse session at the correct point in time, the system 100 tracks/records the actions performed by the chat bot during a co-browse session in a co-browse action database 112. For example, in the illustrative embodiment, the system 100 may store data indicative of the actions performed by the chat bot in association with a user identifier associated with the user of the user device 102. Further, in some embodiments, the data and/or user identifier may be further associated with the relevant intent, which would account for circumstances in which multiple co-browse sessions for unrelated intents could have been interrupted or otherwise remain incomplete.

In some embodiments, the co-browse action database 112 may be embodied as a DynamoDB database or other type of NoSQL database. After all of the actions from the intent configuration file have been completed (i.e., after the co-browse session has been completed), the previously stored session information may be deleted from the co-browse action database 112.

When a user intent has been identified via the intent classification API 106 but there is no intent configuration file for a co-browse session corresponding with the particular intent stored in the intent configuration data store 110, the chat bot is unable to autonomously execute the co-browse session. Instead, the chat bot seamlessly transfers/routes the interaction to a human agent such that the agent can perform the co-browse session with the user via the agent co-browse system 114. The agent co-browse system 114 may be embodied as any type of device or system of the contact center system that may be used by an agent of the contact center for communication with the user (e.g., via the user device 102 and/or the interaction interface 104), the chat bot or other systems/devices of the system 100, and/or otherwise capable of performing the functions described herein. Further, in the illustrative embodiment, the agent co-browse system 114 enables the human agent to engage in co-browsing with the user to assist the user directly. In some embodiments, the agent co-browse system 114 (or computing device used by the agent to interact with the agent co-browse system 114, depending on the particular embodiment) may be embodied as an agent device similar to the agent devices 230 described in reference to the contact center system 200 of FIG. 2.

During the co-browsing session, the system 100 may monitor and record the web actions performed by the human agent throughout the session to the web actions data store 116. In other words, the system 100 records the actions performed in order to resolve the user intent via the co-browsing session to the web actions data store 116 in association with that user intent. It should be appreciated that, each human agent may respond to the user intent differently, for example, using different steps, a different number of steps, and/or a different sequence of steps. For example, in order to check an account balance, two different human agents may access the relevant account balance page through different hyperlink routes. Over time, a sufficiently large sample size of agent-led co-browsing sessions (e.g., a predefined threshold) may have been recorded in order for the machine learning system 118 to perform machine learning on the recorded data set to determine the optimal steps to be performed to resolve the relevant intent and create an intent configuration file for the intent to subsequently be automatically executed by the chat bot during a co-browsing session between a user and a chat bot. In one embodiment, the predefined threshold for the sample size may be 50 interactions. In another embodiment, the predefined threshold may be 100 interactions. As the system 100 can learn the configuration for a new intent automatically, this reduces the manual intervention from a human agent to add a new configuration for each new change introduced in the system. It should be appreciated that, if the co-browse script 108 stopped functioning as expected, the intent configuration file may be removed from the intent configuration data store 110, and the machine learning may be performed again as described herein.

In some embodiments, the machine learning system 118 may utilize a Q-reinforcement machine learning algorithm to perform the functions described herein. However, it should be appreciated that another reinforcement learning and/or other machine learning algorithm may be used in other embodiments. It should be appreciated that Q-learning is an off-policy reinforcement learning algorithm that seeks to find the best action to take given the current state. Q-learning is considered "off-policy" because the Q-learning function learns from actions that are outside of the current policy, like taking random actions, and therefore a policy is not required. More specifically, Q-learning seeks to learn a policy that maximizes the total reward. In some embodiments, a Q-learning algorithm may be represented according to:

$$Q(\text{state,action})=R(\text{state,action})+\gamma*\text{Max}[Q(\text{next state, all actions})].$$

Consider a goal, G, as the final resolution provided by the agent and P as the problem encountered by the user/customer. The model will be fed will all possible solutions given by agents for the problem, P, and whose resolution is the goal, G. The model will then compute Q values for all possible next step actions from the problem, P, and will try to reach a maximum Q value for the next state. Through the mechanism of rewarding and penalizing, the model becomes fine-tuned until it reaches the goal, G. After sufficient training, the model is able to identify an optimized solution given by the agents, which can be used by the machine learning system 118 to generate an intent configuration file for subsequent use by chat bots for automated co-browse sessions with users.

Figure 2:
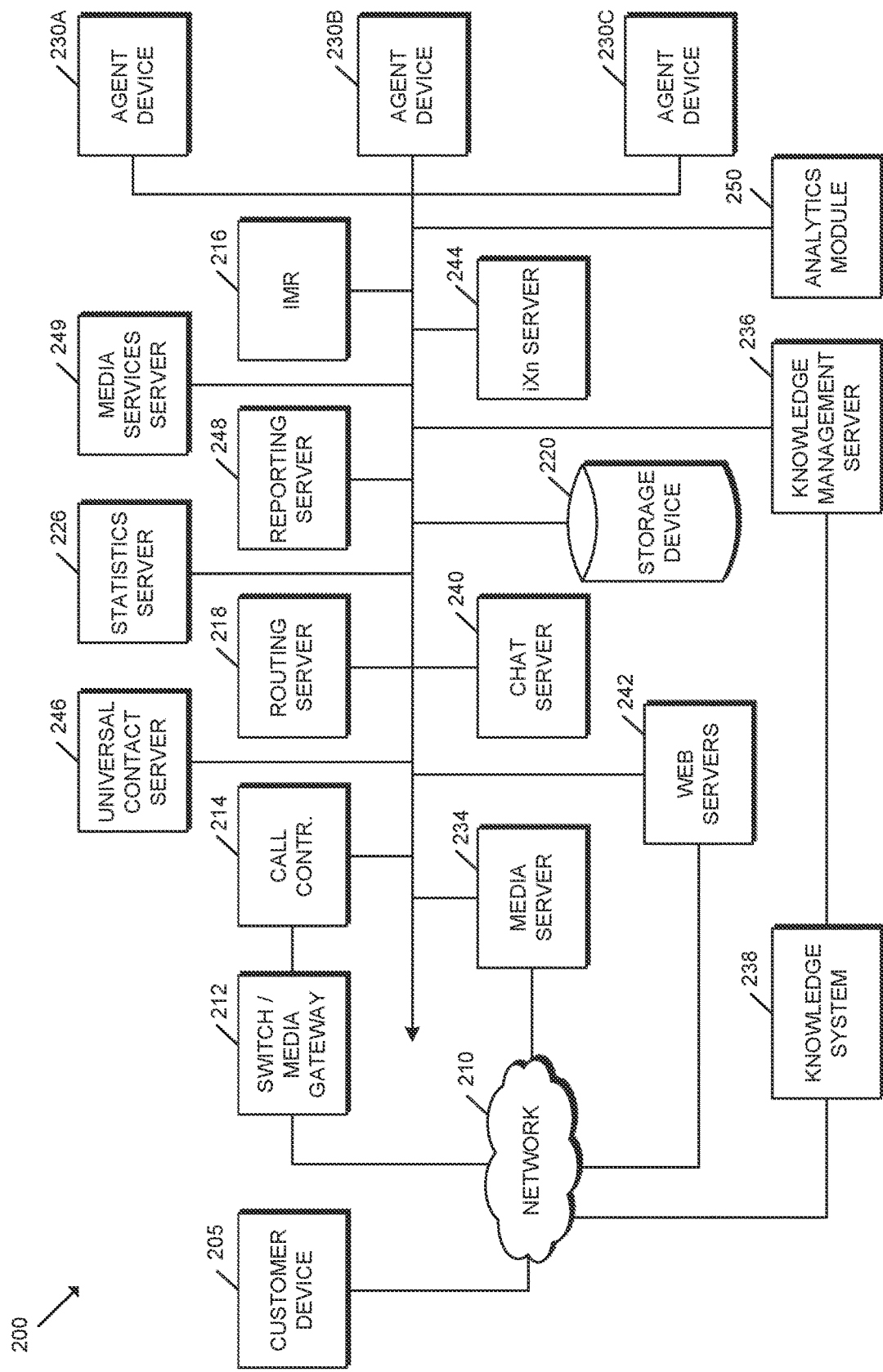
FIG. 2 is a simplified block diagram of at least one embodiment of a contact center system.

It should be appreciated that, in various embodiments, one or more of the user device 102, the interaction interface 104, the intent classification application programming interface (API) 106, the co-browse script 108, the intent configuration data store 110, the co-browse action database 112, the agent co-browse system 114, the web actions data store 116, and/or the machine learning system 118 of the system 100 may be communicatively coupled to, form a portion of, constitute a feature/device superset of, or otherwise involve a contact center system similar to the contact center system 200 of FIG. 2. Additionally, in various embodiments, one or more of the user device 102, the interaction interface 104, the intent classification application programming interface (API) 106, the co-browse script 108, the intent configuration data store 110, the co-browse action database 112, the agent co-browse system 114, the web actions data store 116, and/or the machine learning system 118 of the system 100 may be communicatively coupled to, form a portion of, constitute a feature/device superset of, or otherwise involve a cloud-based system similar to the cloud-based system 300 of FIG. 3. It should be further appreciated that each of the user device 102, the interaction interface 104, the intent classification application programming interface (API) 106, the co-browse script 108, the intent configuration data store 110, the co-browse action database 112, the agent co-browse system 114, the web actions data store 116, and/or the machine learning system 118 of the system 100 may be embodied as, executed by, form a portion of, or associated with any type of device/system, collection of devices/systems, and/or portion(s) thereof suitable for performing the functions described herein (e.g., the computing device 400 of FIG. 4).

Referring now to FIG. 2, a simplified block diagram of at least one embodiment of a communications infrastructure and/or content center system, which may be used in conjunction with one or more of the embodiments described herein, is shown. The contact center system 200 may be embodied as any system capable of providing contact center services (e.g., call center services, chat center services, SMS center services, etc.) to an end user and otherwise performing the functions described herein. The illustrative contact center system 200 includes a customer device 205, a network 210, a switch/media gateway 212, a call controller 214, an interactive media response (IMR) server 216, a routing server 218, a storage device 220, a statistics server 226, agent devices 230A, 230B, 230C, a media server 234, a knowledge management server 236, a knowledge system 238, chat server 240, web servers 242, an interaction (iXn) server 244, a universal contact server 246, a reporting server 248, a media services server 249, and an analytics module 250. Although only one customer device 205, one network 210, one switch/media gateway 212, one call controller 214, one IMR server 216, one routing server 218, one storage device 220, one statistics server 226, one media server 234, one knowledge management server 236, one knowledge system 238, one chat server 240, one iXn server 244, one universal contact server 246, one reporting server 248, one media services server 249, and one analytics module 250 are shown in the illustrative embodiment of FIG. 2, the contact center system 200 may include multiple customer devices 205, networks 210, switch/media gateways 212, call controllers 214, IMR servers 216, routing servers 218, storage devices 220, statistics servers 226, media servers 234, knowledge management servers 236, knowledge systems 238, chat servers 240, iXn servers 244, universal contact servers 246, reporting servers 248, media services servers 249, and/or analytics modules 250 in other embodiments. Further, in some embodiments, one or more of the components described herein may be excluded from the system 200, one or more of the components described as being independent may form a portion of another component, and/or one or more of the component described as forming a portion of another component may be independent.

It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider/agent providing customer services through the contact center system 200), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals," "customers," or "contact center clients"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chat bots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another embodiment, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements described herein may be implemented in cloud-based or cloud computing environments. As used herein and further described below in reference to the computing device 400, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

Figure 4:
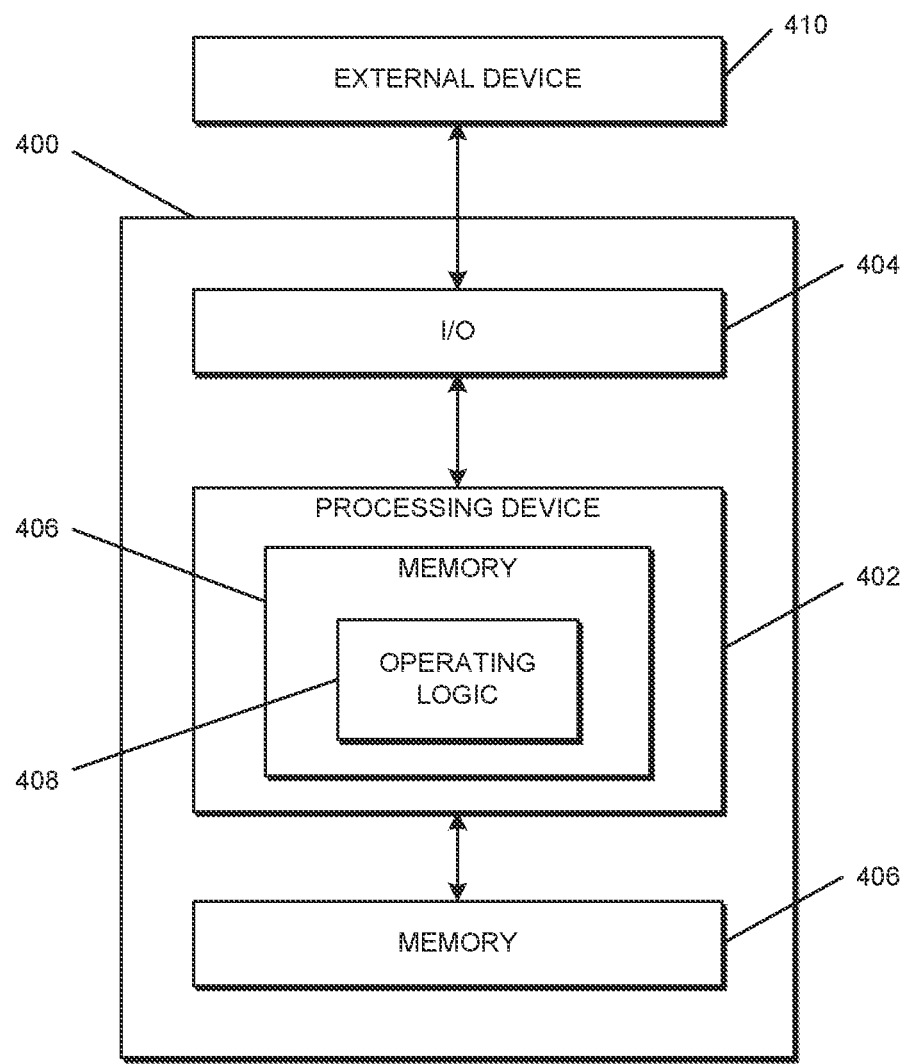
FIG. 4 is a simplified block diagram of at least one embodiment of a computing device.

It should be understood that any of the computer-implemented components, modules, or servers described in relation to FIG. 2 may be implemented via one or more types of computing devices, such as, for example, the computing device 400 of FIG. 4. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 200 may initiate inbound communications (e.g., telephone calls, emails, chats, etc.) to the contact center system 200 via a customer device 205. While FIG. 2 shows one such customer device—i.e., customer device 205—it should be understood that any number of customer devices 205 may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of the network typically depending on the type of customer device being used and the form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 212 may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 212 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, and/or other types of calls. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

The interactive media response (IMR) server 216 may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may instruct customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment.

The routing server 218 may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described herein, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

It should be appreciated that the contact center system 200 may include one or more mass storage devices—represented generally by the storage device 220—for storing data in one or more databases relevant to the functioning of the contact center. For example, the storage device 220 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database. Agent data maintained by the contact center system 200 may include, for example, agent availability and agent profiles, schedules, skills, handle time, and/or other relevant data. As another example, the storage device 220 may store interaction data in an interaction database. Interaction data may include, for example, data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therein or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 226 may be configured to record and aggregate data relating to the performance and operational aspects of the contact center system 200. Such information may be compiled by the statistics server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center system 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. Although FIG. 2 shows three such agent devices 230—i.e., agent devices 230A, 230B and 230C—it should be understood that any number of agent devices 230 may be present in a particular embodiment.

The multimedia/social media server 234 may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 236 may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials. As an example, the knowledge system 238 may be embodied as IBM Watson or a similar system.

The chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chat bots, human agents, or both. In exemplary embodiments, the chat server 240 may perform as a chat orchestration server that dispatches chat conversations among the chat bots and available human agents. In such cases, the processing logic of the chat server 240 may be rules driven so to leverage an intelligent workload distribution among available chat resources. The chat server 240 further may implement, manage, and facilitate user interfaces (UIs) associated with the chat feature, including those UIs generated at either the customer device 205 or the agent device 230. The chat server 240 may be configured to transfer chats within a single chat session with a particular customer between automated and human sources such that, for example, a chat session transfers from a chat bot to a human agent or from a human agent to a chat bot. The chat server 240 may also be coupled to the knowledge management server 236 and the knowledge systems 238 for receiving suggestions and answers to queries posed by customers during a chat so that, for example, links to relevant articles can be provided.

The web servers 242 may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 244 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferrable activities. Once assigned to a particular agent, the deferrable activity is pushed to that agent so that it appears on the agent device 230 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 230 may include a workbin. As an example, a workbin may be maintained in the buffer memory of the corresponding agent device 230.

The universal contact server (UCS) 246 may be configured to retrieve information stored in the customer database and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 249 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 250 may be configured to provide systems and methods for performing analytics on data received from a plurality of different data sources as functionality described herein may require. In accordance with example embodiments, the analytics module 250 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the technology to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database and agent database. The analytics module 250 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 250 may be configured to retrieve data stored within the storage device 220 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 250 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 250 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the disclosure. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment. It should be appreciated that each of the devices of the call center system 200 may be embodied as, include, or form a portion of one or more computing devices similar to the computing device 400 described below in reference to FIG. 4.

Figure 3:
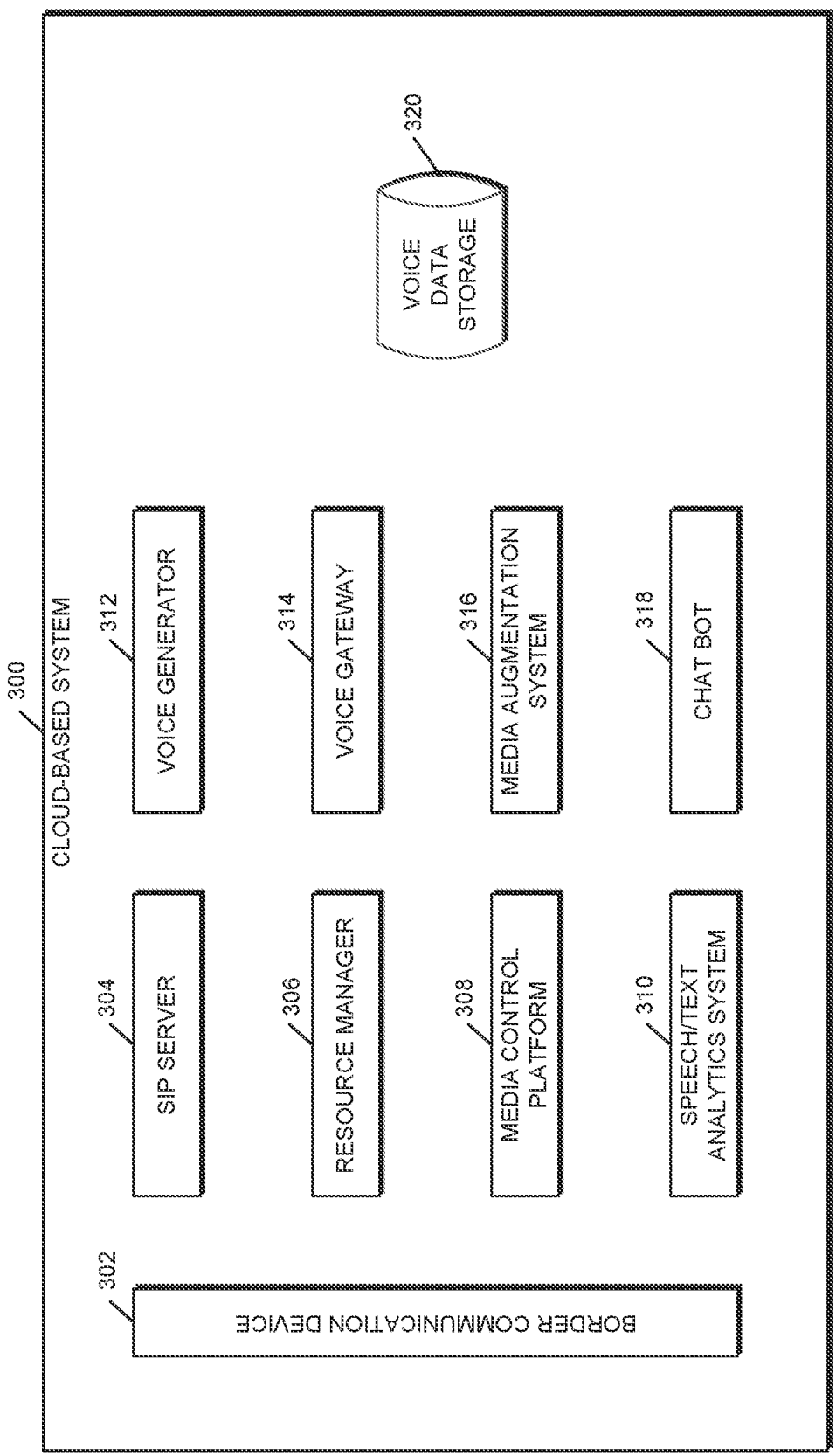
FIG. 3 is a simplified block diagram of at least one embodiment of a cloud-based system.

Referring now to FIG. 3, a simplified block diagram of at least one embodiment of a cloud-based system 300 is shown. The illustrative cloud-based system 300 includes a border communication device 302, a SIP server 304, a resource manager 306, a media control platform 308, a speech/text analytics system 310, a voice generator 312, a voice gateway 314, a media augmentation system 316, a chat bot 318, and a voice data storage 320. Although only one border communication device 302, one SIP server 304, one resource manager 306, one media control platform 308, one speech/text analytics system 310, one voice generator 312, one voice gateway 314, one media augmentation system 316, one chat bot 318, and one voice data storage 320 are shown in the illustrative embodiment of FIG. 3, the cloud-based system 300 may include multiple border communication devices 302, SIP servers 304, resource managers 306, media control platforms 308, speech/text analytics systems 310, voice generators 312, voice gateways 314, media augmentation systems 316, chat bots 318, and/or voice data storages 320 in other embodiments. For example, in some embodiments, multiple chat bots 318 may be used to communicate regarding different subject matters handled by the same cloud-based system 300. Further, in some embodiments, one or more of the components described herein may be excluded from the system 300, one or more of the components described as being independent may form a portion of another component, and/or one or more of the component described as forming a portion of another component may be independent.

The border communication device 302 may be embodied as any one or more types of devices/systems that are capable of performing the functions described herein. For example, in some embodiments, the border communication device 302 may be configured to control signaling and media streams involved in setting up, conducting, and tearing down voice conversations and other media communications between, for example, an end user and contact center system. In some embodiments, the border communication device 302 may be a session border controller (SBC) controlling the signaling and media exchanged during a media session (also referred to as a "call," "telephony call," or "communication session") between the end user and contact center system. In some embodiments, the signaling exchanged during a media session may include SIP, H.323, Media Gateway Control Protocol (MGCP), and/or any other voice-over IP (VoIP) call signaling protocols. The media exchanged during a media session may include media streams that carry the call's audio, video, or other data along with information of call statistics and quality.

In some embodiments, the border communication device 302 may operate according to a standard SIP back-to-back user agent (B2BUA) configuration. In this regard, the border communication device 302 may be inserted in the signaling and media paths established between a calling and called parties in a VoIP call. In some embodiments, it should be understood that other intermediary software and/or hardware devices may be invoked in establishing the signaling and/or media paths between the calling and called parties.

In some embodiments, the border communication device 302 may exert control over signaling (e.g., SIP messages) and media streams (e.g., RTP data) routed to and from a contact center system (e.g., the contact center system 200) and other devices (e.g., a customer/user device) that traverse the network. In this regard, the border communication device 302 may be coupled to trunks that carry signals and media for calls to and from the user device over the network, and to trunks that carry signals and media to and from the contact center system over the network.

The SIP server 304 may be embodied as any one or more types of devices/systems that are capable of performing the functions described herein. For example, in some embodiments, the SIP server 204 may act as a SIP B2UBA and may control the flow of SIP requests and responses between SIP endpoints. Any other controller configured to set up and tear down VoIP communication sessions may be contemplated in addition to or in lieu of the SIP server 304 in other embodiments. The SIP server 304 may be a separate logical component or may be combined with the resource manager 306. In some embodiments, the SIP server 304 may be hosted at a contact center system (e.g., the contact center system 200). Although a SIP server 304 is used in the illustrative embodiment, another call server configured with another VoIP protocol may be used in addition to or in lieu of SIP, such as, for example, H.232 protocol, Media Gateway Control Protocol, Skype protocol, and/or other suitable technologies in other embodiments.

The resource manager 306 may be embodied as any one or more types of devices/systems that are capable of performing the functions described herein. In the illustrative embodiment, the resource manager 306 may be configured to allocate and monitor a pool of media control platforms for providing load balancing and high availability for each resource type. In some embodiments, the resource manager 306 may monitor and may select a media control platform 308 from a cluster of available platforms. The selection of the media control platform 308 may be dynamic, for example, based on identification of a location of a calling end user, type of media services to be rendered, detected quality of a current media service, and/or other factors.

In some embodiments, the resource manager 306 may be configured to process requests for media services, and interact with, for example, a configuration server having a configuration database, to determine an interactive voice response (IVR) profile, voice application (e.g. Voice Extensible Markup Language (Voice XML) application), announcement, and conference application, resource, and service profile that can deliver the service, such as, for example, a media control platform. According to some embodiments, the resource manager may provide hierarchical multi-tenant configurations for service providers, enabling them to apportion a select number of resources for each tenant.

In some embodiments, the resource manager 306 may be configured to act as a SIP proxy, a SIP registrar, and/or a SIP notifier. In this regard, the resource manager 306 may act as a proxy for SIP traffic between two SIP components. As a SIP registrar, the resource manager 306 may accept registration of various resources via, for example, SIP REGISTER messages. In this manner, the cloud-based system 300 may support transparent relocation of call-processing components. In some embodiments, components such as the media control platform 308 do not register with the resource manager 306 at startup. The resource manager 306 may detect instances of the media control platform 308 through configuration information retrieved from the configuration database. If the media control platform 308 has been configured for monitoring, the resource manager 306 may monitor resource health by using, for example, SIP OPTIONS messages. In some embodiments, to determine whether the resources in the group are alive, the resource manager 306 may periodically send SIP OPTIONS messages to each media control platform 308 resource in the group. If the resource manager 306 receives an OK response, the resources are considered alive. It should be appreciated that the resource manager 306 may be configured to perform other various functions, which have been omitted for brevity of the description. The resource manager 306 and the media control platform 308 may collectively be referred to as a media controller.

In some embodiments, the resource manager 306 may act as a SIP notifier by accepting, for example, SIP SUBSCRIBE requests from the SIP server 304 and maintaining multiple independent subscriptions for the same or different SIP devices. The subscription notices are targeted for the tenants that are managed by the resource manager 306. In this role, the resource manager 306 may periodically generate SIP NOTIFY requests to subscribers (or tenants) about port usage and the number of available ports. The resource manager 306 may support multi-tenancy by sending notifications that contain the tenant name and the current status (in- or out-of-service) of the media control platform 308 that is associated with the tenant, as well as current capacity for the tenant.

The media control platform 308 may be embodied as any service or system capable of providing media services and otherwise performing the functions described herein. For example, in some embodiments, the media control platform 308 may be configured to provide call and media services upon request from a service user. Such services may include, without limitation, initiating outbound calls, playing music or providing other media while a call is placed on hold, call recording, conferencing, call progress detection, playing audio/video prompts during a customer self-service session, and/or other call and media services. One or more of the services may be defined by voice applications (e.g. VoiceXML applications) that are executed as part of the process of establishing a media session between the media control platform 308 and the end user.

The speech/text analytics system (STAS) 310 may be embodied as any service or system capable of providing various speech analytics and text processing functionalities (e.g., text-to-speech) as will be understood by a person of skill in the art and otherwise performing the functions described herein. The speech/text analytics system 310 may perform automatic speech and/or text recognition and grammar matching for end user communications sessions that are handled by the cloud-based system 300. The speech/text analytics system 310 may include one or more processors and instructions stored in machine-readable media that are executed by the processors to perform various operations. In some embodiments, the machine-readable media may include non-transitory storage media, such as hard disks and hardware memory systems.

The voice generator 312 may be embodied as any service or system capable of generating a voice communication and otherwise performing the functions described herein. In some embodiments, the voice generator 312 may generate the voice communication based on a particular voice signature.

The voice gateway 314 may be embodied as any service or system capable of performing the functions described herein. In the illustrative embodiment, the voice gateway 314 receives end user calls from or places calls to voice communications devices, such as an end user device, and responds to the calls in accordance with a voice program that corresponds to a communication routing configuration of the contact center system. In some embodiments, the voice program may include a voice avatar. The voice program may be accessed from local memory within the voice gateway 314 or from other storage media in the cloud-based system 300. In some embodiments, the voice gateway 314 may process voice programs that are script-based voice applications. The voice program, therefore, may be a script written in a scripting language, such as voice extensible markup language (VoiceXML) or speech application language tags (SALT). The cloud-based system 300 may also communicate with the voice data storage 320 to read and/or write user interaction data (e.g., state variables for a data communications session) in a shared memory space.

The media augmentation system 316 may be embodied as any service or system capable of specifying how the portions of the cloud-based system 300 (e.g., one or more of the border communications device 302, the SIP server 304, the resource manager 306, the media control platform 308, the speech/text analytics system 310, the voice generator 312, the voice gateway 314, the media augmentation system 316, the chat bot 318, the voice data storage 320, and/or one or more portions thereof) interact with each other and otherwise performing the functions described herein. In some embodiments, the media augmentation system 316 may be embodied as or include an application program interface (API). In some embodiments, the media augmentation system 316 enables integration of differing parameters and/or protocols that are used with various planned application and media types utilized within the cloud-based system 300.

The chat bot 318 may be embodied as any automated service or system capable of using automation to engage with end users and otherwise performing the functions described herein. For example, in some embodiments, the chat bot 318 may operate, for example, as an executable program that can be launched according to demand for the particular chat bot. In some embodiments, the chat bot 318 simulates and processes human conversation (either written or spoken), allowing humans to interact with digital devices as if the humans were communicating with another human. In some embodiments, the chat bot 318 may be as simple as rudimentary programs that answer a simple query with a single-line response, or as sophisticated as digital assistants that learn and evolve to deliver increasing levels of personalization as they gather and process information. In some embodiments, the chat bot 318 includes and/or leverages artificial intelligence, adaptive learning, bots, cognitive computing, and/or other automation technologies. Chat bot 318 may also be referred to herein as one or more chat robots, AI chat bots, automated chat robot, chatterbots, dialog systems, conversational agents, automated chat resources, and/or bots.

A benefit of utilizing automated chat robots for engaging in chat conversations with end users may be that it helps contact centers to more efficiently use valuable and costly resources like human resources, while maintaining end user satisfaction. For example, chat robots may be invoked to initially handle chat conversations without a human end user knowing that it is conversing with a robot. The chat conversation may be escalated to a human resource if and when appropriate. Thus, human resources need not be unnecessarily tied up in handling simple requests and may instead be more effectively used to handle more complex requests or to monitor the progress of many different automated communications at the same time.

The voice data storage 320 may be embodied as one or more databases, data structures, and/or data storage devices capable of storing data in the cloud-based system 300 or otherwise facilitating the storage of such data for the cloud-based system 300. For example, in some embodiments, the voice data storage 320 may include one or more cloud storage buckets. In other embodiments, it should be appreciated that the voice data storage 320 may, additionally or alternatively, include other types of voice data storage mechanisms that allow for dynamic scaling of the amount of data storage available to the cloud-based system 300. In some embodiments, the voice data storage 320 may store scripts (e.g., pre-programmed scripts or otherwise).

Although the voice data storage 320 is described herein as data storages and databases, it should be appreciated that the voice data storage 320 may include both a database (or other type of organized collection of data and structures) and data storage for the actual storage of the underlying data. The voice data storage 320 may store various data useful for performing the functions described herein.

Referring now to FIG. 4, a simplified block diagram of at least one embodiment of a computing device 400 is shown. The illustrative computing device 400 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 400, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 200 of FIG. 2 and/or the cloud-based system 300 of FIG. 3—the various servers and computer devices thereof may be located on local computing devices 400 (e.g., on-site at the same physical location as the agents of the contact center), remote computing devices 400 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 400 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 400 includes a processing device 402 that executes algorithms and/or processes data in accordance with operating logic 408, an input/output device 404 that enables communication between the computing device 400 and one or more external devices 410, and memory 406 which stores, for example, data received from the external device 410 via the input/output device 404.

The input/output device 404 allows the computing device 400 to communicate with the external device 410. For example, the input/output device 404 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry.

Communication circuitry of the computing device 400 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 400. The input/output device 404 may include hardware, software, and/or firmware suitable for performing the techniques described herein.

The external device 410 may be any type of device that allows data to be inputted or outputted from the computing device 400. For example, in various embodiments, the external device 410 may be embodied as one or more of the devices/systems described herein, and/or a portion thereof. Further, in some embodiments, the external device 410 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 410 may be integrated into the computing device 400.

The processing device 402 may be embodied as any type of processor(s) capable of performing the functions described herein. In particular, the processing device 402 may be embodied as one or more single or multi-core processors, microcontrollers, or other processor or processing/controlling circuits. For example, in some embodiments, the processing device 402 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 402 may be a programmable type, a dedicated hardwired state machine, or a combination thereof. Processing devices 402 with multiple processing units may utilize distributed, pipelined, and/or parallel processing in various embodiments. Further, the processing device 402 may be dedicated to performance of just the operations described herein, or may be utilized in one or more additional applications. In the illustrative embodiment, the processing device 402 is programmable and executes algorithms and/or processes data in accordance with operating logic 408 as defined by programming instructions (such as software or firmware) stored in memory 406. Additionally or alternatively, the operating logic 408 for processing device 402 may be at least partially defined by hardwired logic or other hardware. Further, the processing device 402 may include one or more components of any type suitable to process the signals received from input/output device 404 or from other components or devices and to provide desired output signals. Such components may include digital circuitry, analog circuitry, or a combination thereof.

The memory 406 may be of one or more types of non-transitory computer-readable media, such as a solid-state memory, electromagnetic memory, optical memory, or a combination thereof. Furthermore, the memory 406 may be volatile and/or nonvolatile and, in some embodiments, some or all of the memory 406 may be of a portable type, such as a disk, tape, memory stick, cartridge, and/or other suitable portable memory. In operation, the memory 406 may store various data and software used during operation of the computing device 400 such as operating systems, applications, programs, libraries, and drivers. It should be appreciated that the memory 406 may store data that is manipulated by the operating logic 408 of processing device 402, such as, for example, data representative of signals received from and/or sent to the input/output device 404 in addition to or in lieu of storing programming instructions defining operating logic 408. As shown in FIG. 4, the memory 406 may be included with the processing device 402 and/or coupled to the processing device 402 depending on the particular embodiment. For example, in some embodiments, the processing device 402, the memory 406, and/or other components of the computing device 400 may form a portion of a system-on-a-chip (SoC) and be incorporated on a single integrated circuit chip.

In some embodiments, various components of the computing device 400 (e.g., the processing device 402 and the memory 406) may be communicatively coupled via an input/output subsystem, which may be embodied as circuitry and/or components to facilitate input/output operations with the processing device 402, the memory 406, and other components of the computing device 400. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 400 may include other or additional components, such as those commonly found in a typical computing device (e.g., various input/output devices and/or other components), in other embodiments. It should be further appreciated that one or more of the components of the computing device 400 described herein may be distributed across multiple computing devices. In other words, the techniques described herein may be employed by a computing system that includes one or more computing devices. Additionally, although only a single processing device 402, I/O device 404, and memory 406 are illustratively shown in FIG. 4, it should be appreciated that a particular computing device 400 may include multiple processing devices 402, I/O devices 404, and/or memories 406 in other embodiments. Further, in some embodiments, more than one external device 410 may be in communication with the computing device 400.

The computing device 400 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 400 may communicate with other computing devices 400 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 400 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

Figure 5:
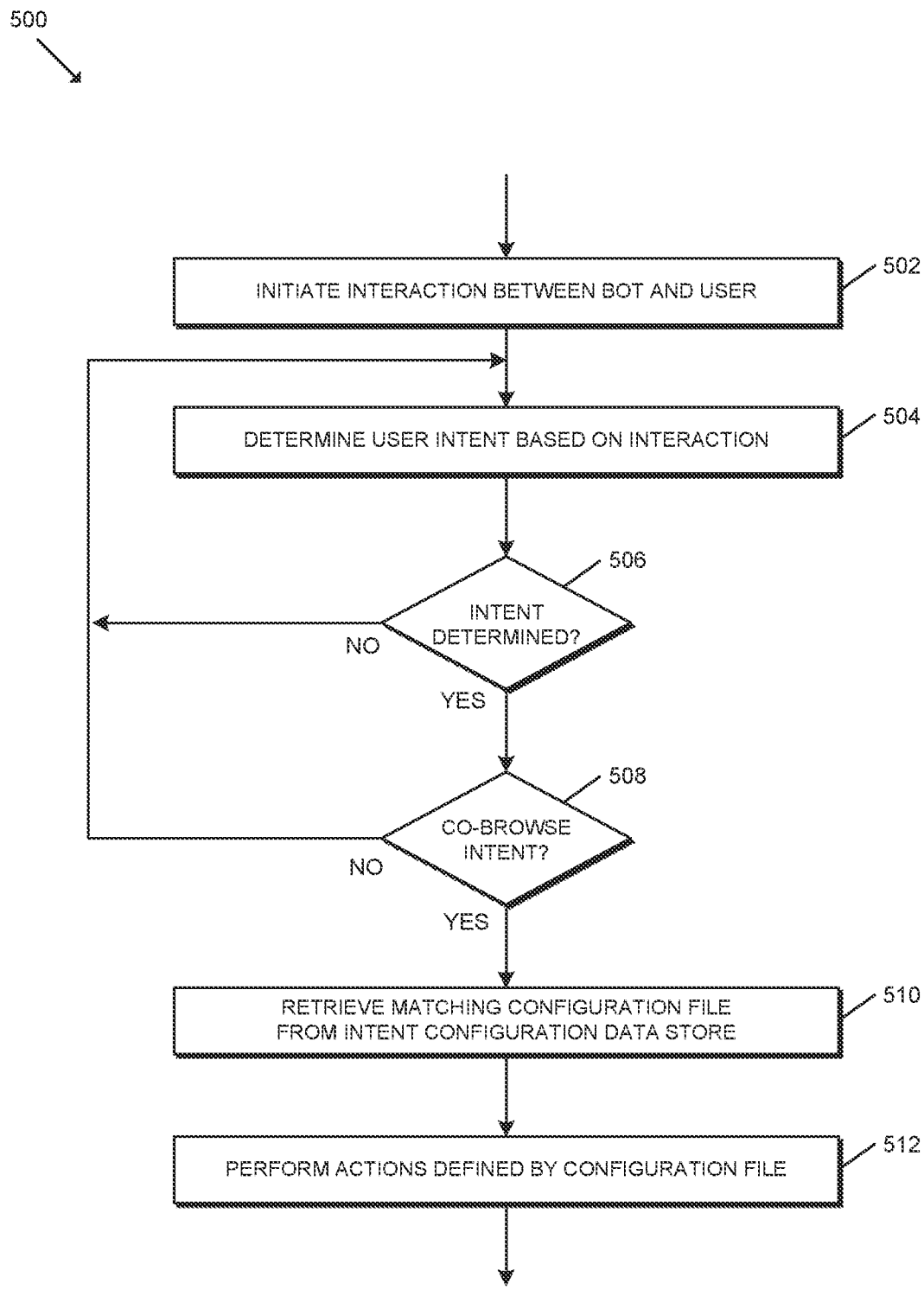
FIG. 5 is a simplified flow diagram of at least one embodiment of a method of proactively offering a co-browse session to a user via a chat bot.

Referring now to FIG. 5, in use, the system 100 may execute a method 500 for proactively offering a co-browse session to a user via a chat bot. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 512 in which the system 100 initiates an interaction between a user and a chat bot. It should be appreciated that, in some embodiments, the interaction may be initiated by the user (e.g., by requesting assistance via a webpage and/or web-based interface), whereas in other embodiments, the interaction may be initiated by the chat bot (e.g., by proactively asking the user whether the user would like assistance, such as after a threshold period of time of inactivity).

In block 504, the system 100 (e.g., via the intent classification API 106) determines (or attempts to determine) the user intent based on the interaction between the user and the chat bot. It should be appreciated that, in some embodiments, the system 100 may require a certain amount of information in order to ascertain the intent of the user. Accordingly, in circumstances in which the system 100 has insufficient data to determine intent, the system 100 may request additional information (e.g., via the chat bot) or otherwise obtain the relevant information in order to determine the user intent. If the user intent has been determined, in block 506, based on the interaction between the user and the chat bot (and/or based on other information), the method 500 advances to block 508 in which the system 100 determines whether the user intent is indicative of a desire to initiate a co-browse session with the chat bot. For example, the user intent may involve a desire to resolve a particular problem and also a desire to do so using the co-browse session with the chat bot.

If the system 100 determines that there is no co-browse intent, the method 500 returns to block 504. Otherwise, the method 500 advances to block 510 in which the system 100 retrieves a matching intent configuration file associated with the user intent from the intent configuration data store 110. In block 512, the system 100 (e.g., via the chat bot) performs the actions defined by the intent configuration file. As described above, each intent configuration file may include one or more sequences of the various actions (e.g., mouse movements/interactions, screen pointers, screen changes, audio/video instructions, text entry, and/or other actions) to be executed by the chat bot in order to automatically resolve the user intent in a manner similar to how it would be resolved by a human agent. Further, the intent configuration file may be executed using a co-browse script 108 embedded (e.g., as JavaScript) into the webpage or web-based application being executed by the user device 102 of the user.

Although the blocks 502-512 are described in a relatively serial manner, it should be appreciated that various blocks of the method 500 may be performed in parallel in some embodiments.

Figure 10:

FIGS. 10-11 are an example interaction between a user and a chat bot that illustrates at least one embodiment of the method 500 of FIG. 5. In particular, in the illustrative embodiment of FIGS. 10-11, a customer desires to open a Senior Citizen Account with a particular Bank through its complex website. The customer is unable to find the information required to open the account that the customer desired, and after a predefined period of time, the chat bot proactively engages with the customer to offer a co-browse session for opening an account. When the customer accepts the offer for the co-browse session from the chat bot, the chat bot then performs the relevant co-browse actions through the embedded JavaScript within the relevant webpage(s). FIGS. 10-11 illustrate sample dialogue that occurs during the exemplary user-bot interaction.

Figure 6:
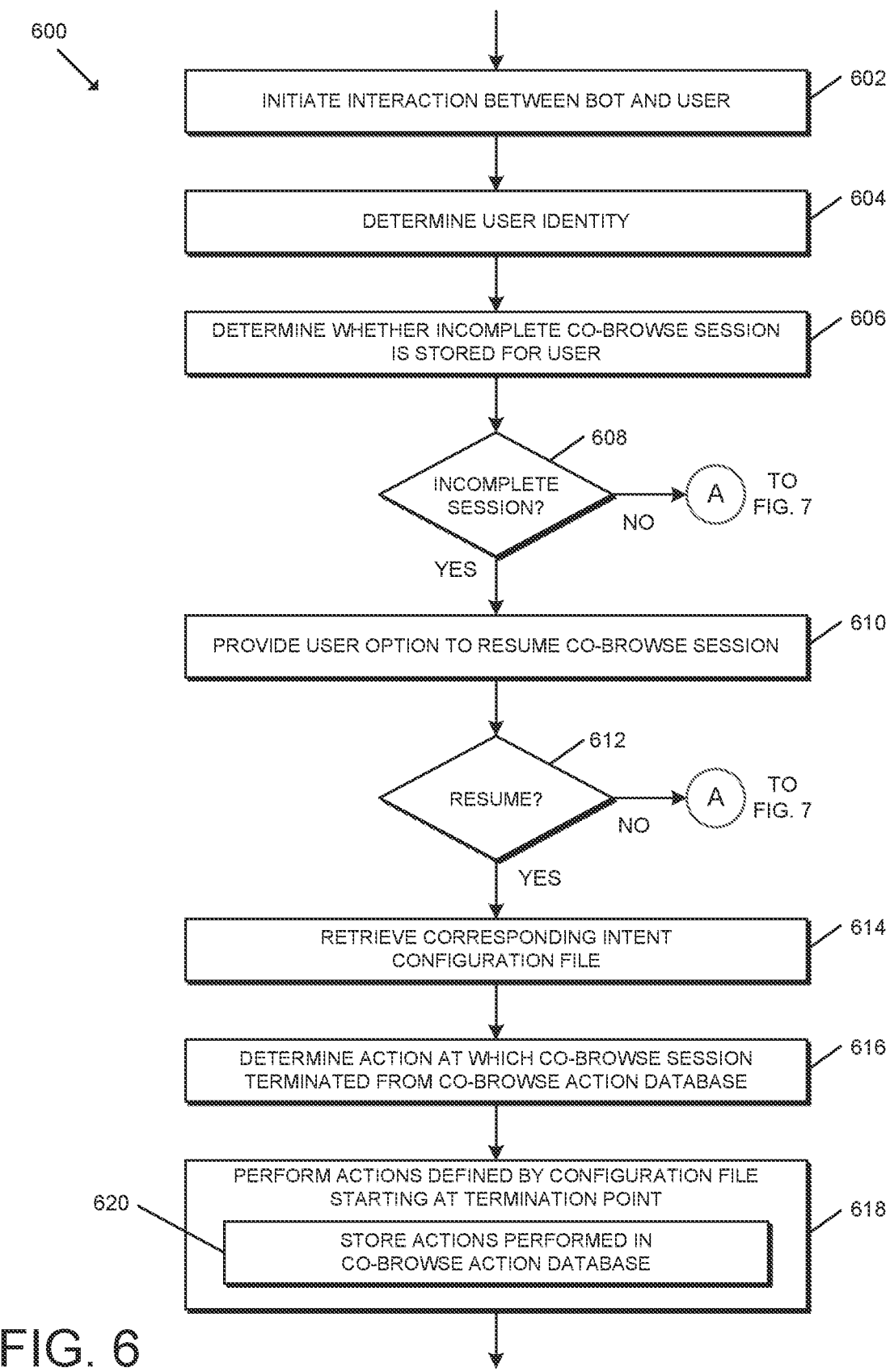
FIGS. 6-7 are a simplified flow diagram of at least one embodiment of a method of asynchronously restoring an incomplete co-browse session via a chat bot.
Figure 7:
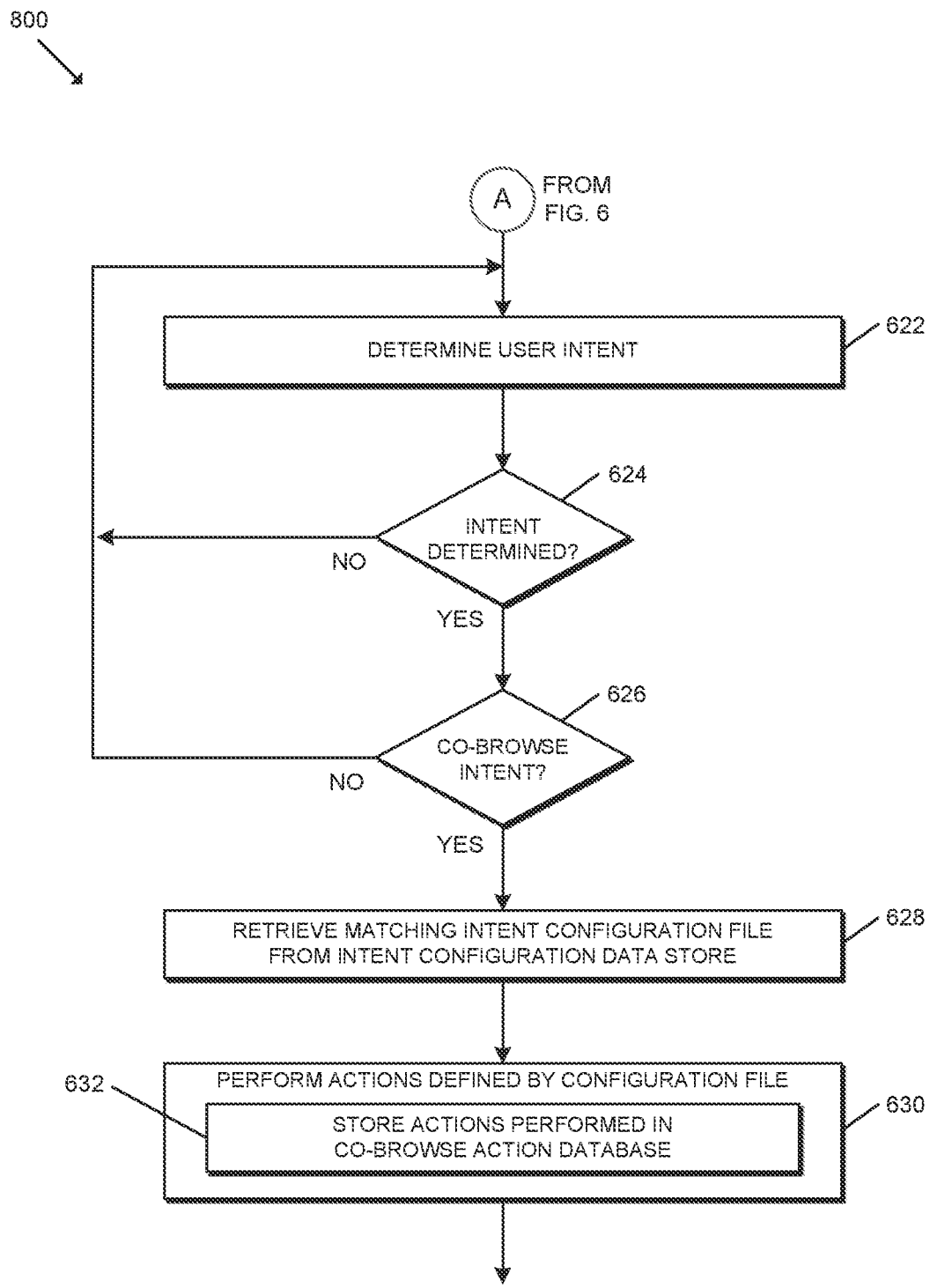

Referring now to FIGS. 6-7, in use, the system 100 may execute a method 600 for asynchronously restoring an incomplete co-browse session via a chat bot. It should be appreciated that the particular blocks of the method 600 are illustrated by way of example, and such blocks may be combined or divided, added or removed, and/or reordered in whole or in part depending on the particular embodiment, unless stated to the contrary.

The illustrative method 600 begins with block 602 of FIG. 6 in which the system 100 initiates an interaction between a user and a chat bot. It should be appreciated that, in some embodiments, the interaction may be initiated by the user (e.g., by requesting assistance via a webpage and/or web-based interface), whereas in other embodiments, the interaction may be initiated by the chat bot (e.g., by proactively asking the user whether the user would like assistance, such as after a threshold period of time of inactivity).

In block 604, the system 100 determines the identity of the user. More specifically, in some embodiments, the system 100 determines a unique identifier associated with the user. It should be appreciated that the particular identifier may be any type of identifier suitable for performing the functions described herein, and the system 100 may ascertain the identifier through any suitable process. For example, in some embodiments, the user identifier may be embodied as a globally unique identifier (GUID). In other embodiments, the user identifier may be embodied as or inferred based on the IP address of the user device 102. In yet another embodiment, the user identifier may be based on user input (e.g., during the interaction or prior interaction).

In block 606, the system 100 determines whether an incomplete co-browse session is stored for the user. For example, in some embodiments, the system 100 determines whether the co-browse action database 112 includes data for an incomplete session stored in association with the user identifier. If the system 100 determines, in block 608, that there is no incomplete session associated with the user, the method 600 advances to block 622 of FIG. 7. However, if the system 100 determines that there is an incomplete session associated with the user, the method 600 advances to block 610 in which the chat bot provides the user with an option to resume the incomplete co-browse session. If, in block 612, the user opts to resume the incomplete co-browse session, the method 600 advances to block 614 in which the system 100 retrieves the corresponding intent configuration file from the intent configuration data store 110. Additionally, in block 616, the system 100 determines the action at which the co-browse session was terminated based on data stored in the co-browse action database 112. As indicated above, in some embodiments, the system 100 may monitor and record the actions performed during a co-browse session such that the user can subsequently resume an incomplete co-browse session in the event of a disconnection or disruption during the co-browse session.

In block 618, the chat bot performs the actions defined by the intent configuration file starting at the termination point of the incomplete session that has been resumed. Further, in block 612, the system 100 may resumes monitoring and storing the actions performed by the chat bot during the resumed co-browse session in the co-browse action database 112 (e.g., in case the co-browse session is once again prematurely terminated).

Returning to block 612, if the user does not opt to resume the incomplete co-browse session, the method 600 advances to block 622 of FIG. 7 in which the system 100 (e.g., via the intent classification API 106) determines (or attempts to determine) the user intent based on the interaction between the user and the chat bot. As described above, in some embodiments, the system 100 may require a certain amount of information in order to ascertain the intent of the user. Accordingly, in circumstances in which the system 100 has insufficient data to determine intent, the system 100 may request additional information (e.g., via the chat bot) or otherwise obtain the relevant information in order to determine the user intent. If the user intent has been determined, in block 624, based on the interaction between the user and the chat bot (and/or based on other information), the method 600 advances to block 626 in which the system 100 determines whether the user intent is indicative of a desire to initiate a co-browse session with the chat bot. For example, the user intent may involve a desire to resolve a particular problem and also a desire to do so using the co-browse session with the chat bot.

If the system 100 determines that there is no co-browse intent, the method 600 returns to block 622. Otherwise, the method 600 advances to block 628 in which the system 100 retrieves a matching intent configuration file associated with the user intent from the intent configuration data store 110. In block 630, the system 100 (e.g., via the chat bot) performs the actions defined by the intent configuration file in a manner similar to that described above. Further, in block 632, the system 100 may monitor and store the actions performed by the chat bot during the co-browse session in the co-browse action database 112 (e.g., to resume the co-browse session in case the co-browse session is prematurely terminated).

Although the blocks 602-632 are described in a relatively serial manner, it should be appreciated that various blocks of the method 600 may be performed in parallel in some embodiments.

Figure 12:

FIGS. 12-14 are an example interaction between a user and a chat bot that illustrates at least one embodiment of the method 600 of FIGS. 6-7. In particular, in the illustrative embodiment of FIGS. 12-14, a customer is disconnected in the middle of a co-browse session with a chat bot due to an unforeseen situation. When the customer initiates a new conversation with the chat bot, the chat bot provides the customer with the option to continue the customer's co-browse session from where the customer left off. When the customer accepts to continue the co-browse session, the previous incomplete session is restored asynchronously, and the chat bot assists the customer to continue filling out the form on the webpage accessed by the user. It should be appreciated that after the customer successfully completes all of the steps (e.g., to create a Senior Bank Account in the exemplary embodiment), the previous session data may be deleted from the co-browse action database 112. FIGS. 12-14 illustrate sample dialogue that occurs during the exemplary user-bot interaction.

Figure 8:
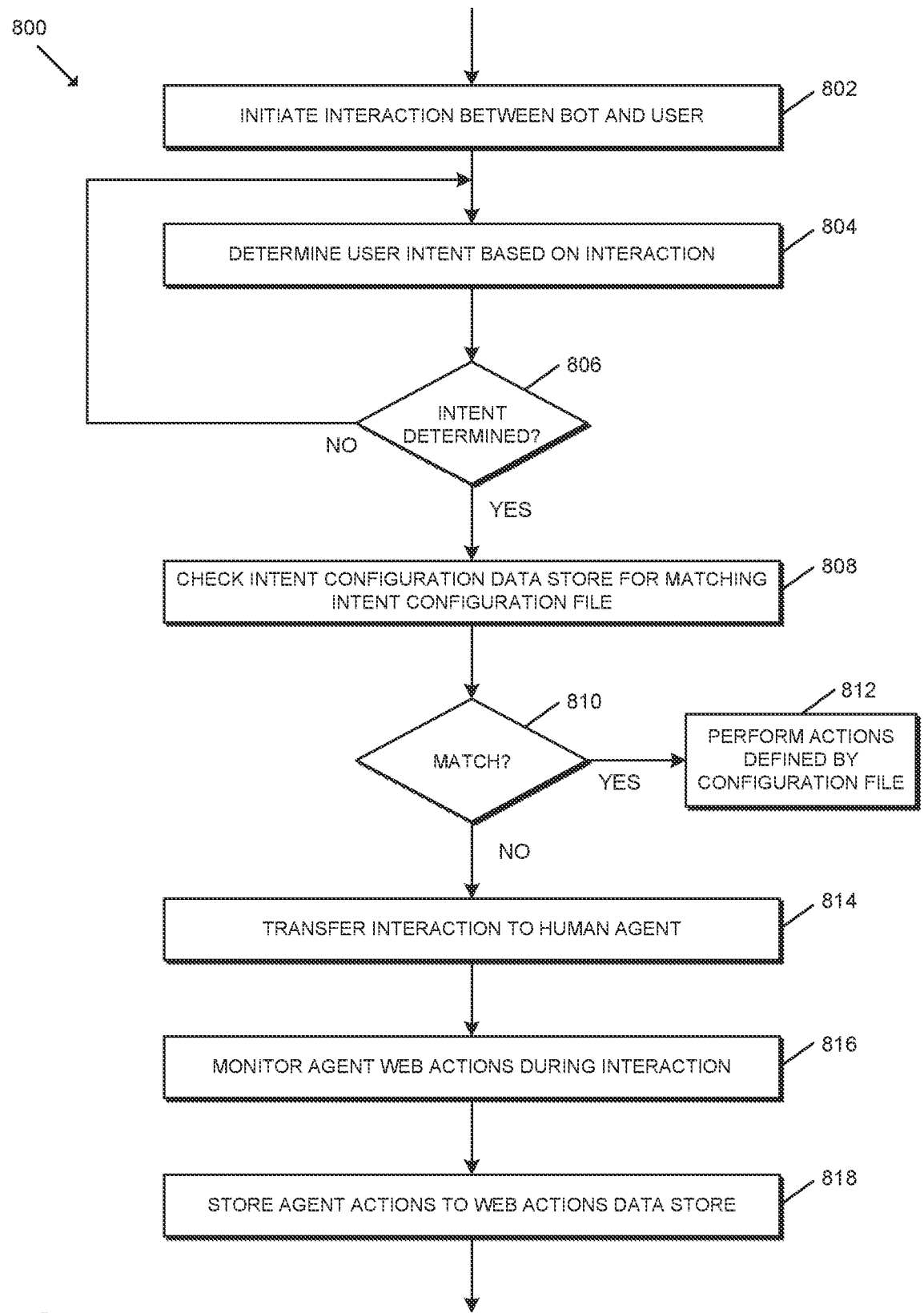
FIG. 8 is a simplified flow diagram of at least one embodiment of a method of monitoring web actions performed by an agent.

Referring now to FIG. 8, in use, the system 100 may execute a method 800 for monitoring web actions performed by an agent. It should be appreciated that the particular blocks of the method 800 are illustrated by way of example, and such blocks may be combined or divided, added or removed, and/or reordered in whole or in part depending on the particular embodiment, unless stated to the contrary.

The illustrative method 800 begins with block 802 in which the system 100 initiates an interaction between a user and a chat bot. As described above, in some embodiments, the interaction may be initiated by the user (e.g., by requesting assistance via a webpage and/or web-based interface), whereas in other embodiments, the interaction may be initiated by the chat bot (e.g., by proactively asking the user whether the user would like assistance, such as after a threshold period of time of inactivity).

In block 804, the system 100 (e.g., via the intent classification API 106) determines (or attempts to determine) the user intent based on the interaction between the user and the chat bot. As described above, in some embodiments, the system 100 may require a certain amount of information in order to ascertain the intent of the user. Accordingly, in circumstances in which the system 100 has insufficient data to determine intent, the system 100 may request additional information (e.g., via the chat bot) or otherwise obtain the relevant information in order to determine the user intent. If the user intent has been determined, in block 806, based on the interaction between the user and the chat bot (and/or based on other information), the method 800 advances to block 808 in which the system 100 checks the intent configuration data store 110 for a matching intent configuration file. In other words, the system 100 determines whether an intent configuration file for an automated co-browse session has previously been generated for the particular user intent and stored in association with that user intent in the intent configuration data store 110.

If the system 100 determines, in block 810, that there is a match, the method 800 advances to block 812 in which the chat bot performs the actions defined by the configuration file to perform the co-browse session without interaction from a human agent in a manner similar to that described above. However, if the system 100 determines that there is no match (i.e., that there is no intent configuration file stored in the intent configuration data store 110 for the particular user intent), the method 800 advances to block 814 in which the system 100 seamlessly transfers/routes the interaction between the chat bot and the user to a human agent, such that the human agent can engage in a co-browse session with the user. It should be appreciated that, in some embodiments, the system 100 may allow the user to opt to transfer an interaction or co-browse session between the user and chat bot to a human agent at any point during the interaction/session (e.g., via respective user input), and in response, the chat bot may immediately router/transfer the interaction/session to the human agent.

In block 816, the system 100 monitors the web actions performed by the agent during the interaction and, more specifically, during the co-browse session between the user and the agent. For example, in the illustrative embodiment, the system 100 may track the DOM elements and mouse movements/interactions, screen pointers, screen changes, audio/video instructions, text entry, and/or other actions performed by the agent. In block 818, the system 100 stores/records the actions performed by the agent to the web actions data store 116 (e.g., for subsequent machine learning). It should be appreciated that the web actions may be stored in the web actions data store 116 in any suitable format for performing the functions described herein.

Although the blocks 802-818 are described in a relatively serial manner, it should be appreciated that various blocks of the method 800 may be performed in parallel in some embodiments.

Figure 9:
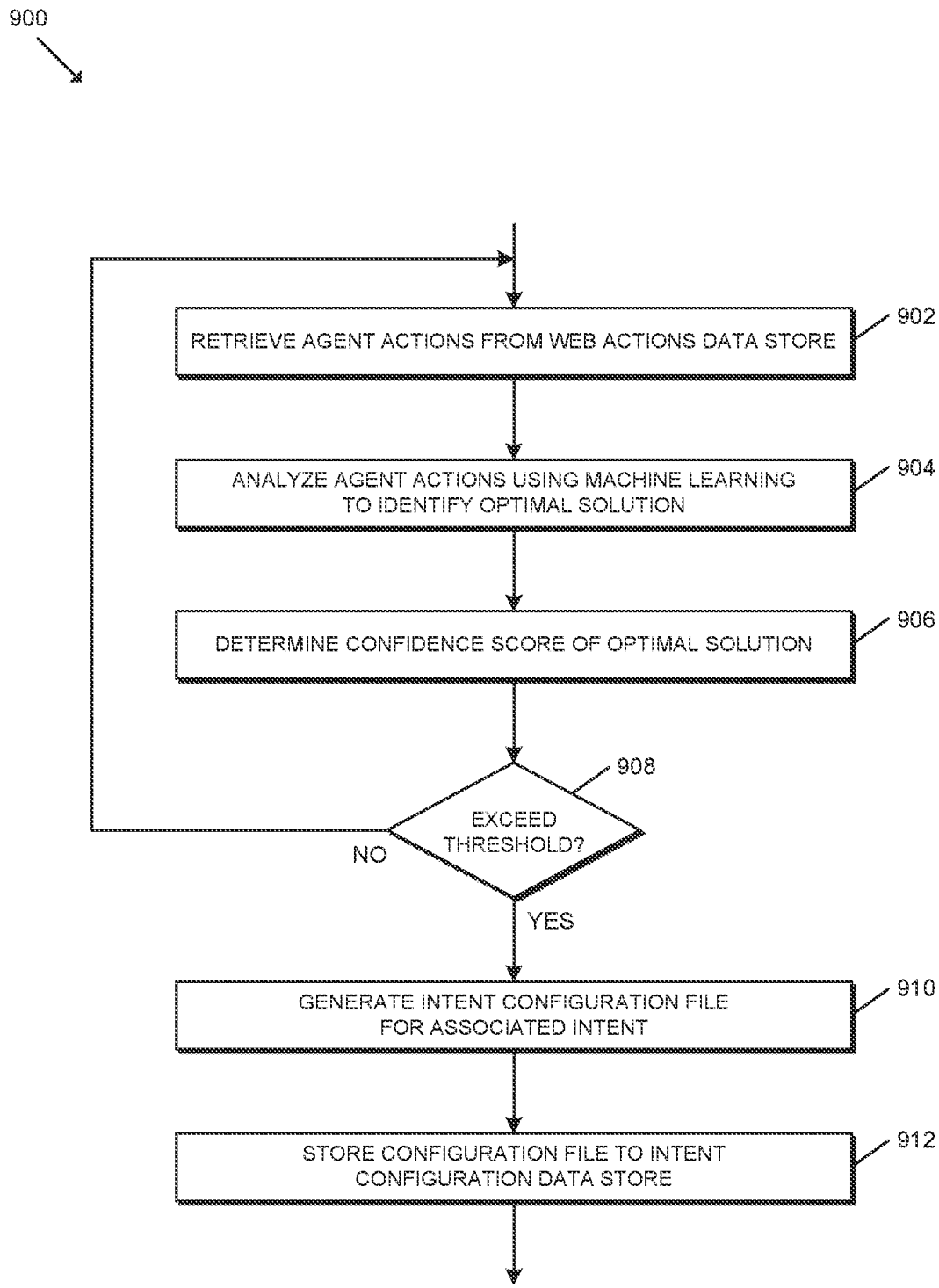
FIG. 9 is a simplified flow diagram of at least one embodiment of a method of generating a co-browse intent configuration file based on machine learning of web actions performed by agents.

Referring now to FIG. 9, in use, the system 100 may execute a method 900 for generating a co-browse configuration file based on machine learning of web actions performed by agents. It should be appreciated that the particular blocks of the method 900 are illustrated by way of example, and such blocks may be combined or divided, added or removed, and/or reordered in whole or in part depending on the particular embodiment, unless stated to the contrary.

The illustrative method 900 begins with block 902 in which the system 100 (e.g., the machine learning system 118) retrieves co-browse session agent actions from the web actions data store 116 that are stored in association with the resolution of a particular user intent. For example, as discussed above, it should be appreciated that each human agent may respond to the user intent differently, for example, using different steps, a different number of steps, and/or a different sequence of steps.

In block 904, the system 100 (e.g., the machine learning system 118) analyzes the agent actions using one or more machine learning algorithms to identify an optimal solution (or best known solution) for resolving the user intent. As described above, in some embodiments, the system 100 requires at least some threshold number of stored solutions in order to perform the machine learning.

In block 906, the system 100 (e.g., the machine learning system 118) determines a confidence score associated with the optimal solution (or best known solution) identified by the system 100. It should be appreciated that, in the illustrative embodiment, the confidence score must exceed (or be at least) a predefined confidence threshold in order for the system 100 to rely on the solution to automate a co-browse session executed by a chat bot. For example, in some embodiments, the predefined confidence threshold may be at least 90% confidence. In another embodiment, the predefined confidence threshold may be at least 98% confidence. If the system 100 determines, in block 908, that the confidence score exceeds (or is at least) the predefined confidence threshold, the method 900 advances to block 910 in which the system 100 generates an intent configuration file for the associated user intent. In some embodiments, it should be appreciated that the confidence threshold may not be met by the solution provided by the human agents, in which case the interactions may be sent to human agents until the confidence threshold has been reached. In block 912, the system 100 stores the generated intent configuration file in the intent configuration data store 110. As described above, if the intent configuration file stopped functioning as expected, the intent configuration file may be removed from the intent configuration data store 110, and the machine learning may again be performed to update (e.g., generate a new) intent configuration file for the user intent.

Although the blocks 902-912 are described in a relatively serial manner, it should be appreciated that various blocks of the method 900 may be performed in parallel in some embodiments.

What is claimed is:

1. A method for asynchronously restoring an incomplete co-browse session, the method comprising:
   initiating an interaction between a user and a chat bot;
   determining whether data indicative of an incomplete co-browse session is stored in association with a user in response to initiating the interaction between the user and the chat bot;
   retrieving an intent configuration file associated with the incomplete co-browse session, wherein the intent configuration file defines a plurality of actions to be executed by the chat bot to resolve a user intent of the interaction between the user and the chat bot;
   performing, via the chat bot and during a resumed co-browse session with the user, one or more actions of the plurality of actions defined by the intent configuration file that were not previously performed during the incomplete co-browse session; and further comprising generating the intent configuration file using machine learning based on an analysis of a plurality of co-browse sessions between users and contact center agents.

2. The method of claim 1, wherein the plurality of actions comprises at least one of a mouse movement, mouse interaction, screen pointer, screen change, audio instruction, video instruction, or text entry.

3. The method of claim 1, wherein the intent configuration file defines a sequence of the plurality of actions to be executed by the chat bot to resolve the user intent.

4. The method of claim 1, wherein determining whether data indicative of an incomplete co-browse session is stored in associated with the user comprises:
determining a unique identifier associated with the user; and
comparing the unique identifier to a co-browse action database.

5. The method of claim 1, wherein the plurality of actions comprises a sequence of web actions involving interactions with one or more web pages.

6. The method of claim 1, further comprising determining a point in the intent configuration file at which the incomplete co-browse session was terminated; and
wherein performing the one or more actions defined by the intent configuration file comprises performing actions defined by the intent configuration file starting at the point in the intent configuration file at which the incomplete co-browse session was terminated.

7. The method of claim 1, wherein the plurality of actions comprises a sequence of web actions involving interactions with one or more Document Object Model (DOM) elements of a web page; and
wherein performing the one or more actions of the plurality of actions defined by the intent configuration file comprises automatically interacting, by the chat bot, with the one or more DOM elements of the web page.

8. A system for asynchronously restoring an incomplete co-browse session, the system comprising:
at least one processor; and
at least one memory comprising a plurality of instructions stored thereon that, in response to execution by the at least one processor, causes the system to:
initiate an interaction between a user and a chat bot;
determine whether data indicative of an incomplete co-browse session is stored in association with a user in response to initiating the interaction between the user and the chat bot;
retrieve an intent configuration file associated with the incomplete co-browse session, wherein the intent configuration file defines a plurality of actions to be executed by the chat bot to resolve a user intent of the interaction between the user and the chat bot, and wherein the plurality of actions comprises a sequence of web actions involving interactions with one or more Document Object Model (DOM) elements of a web page; and
perform, via the chat bot and during a resumed co-browse session with the user, one or more actions of the plurality of actions defined by the intent configuration file that were not previously performed during the incomplete co-browse session, wherein to perform the one or more actions of the plurality of actions defined by the intent configuration file comprises to automatically interact, by the chat bot, with the one or more DOM elements of the web page.

9. The system of claim 8, wherein the plurality of actions comprises at least one of a mouse movement, mouse interaction, screen pointer, screen change, audio instruction, video instruction, or text entry.

10. The system of claim 8, wherein the intent configuration file defines a sequence of the plurality of actions to be executed by the chat bot to resolve the user intent.

11. The system of claim 8, wherein to determine whether data indicative of an incomplete co-browse session is stored in associated with the user comprises to:
determine a unique identifier associated with the user; and
compare the unique identifier to a co-browse action database.

12. The system of claim 8, wherein the plurality of actions comprises a plurality of web actions involving interactions with one or more web pages.

13. The system of claim 8, wherein the plurality of instructions further causes the system to provide, via the chat bot, the user with an option to resume the incomplete co-browse session; and
wherein to retrieve the intent configuration file associated with the incomplete co-browse session is in response to receiving an indication that the user indicates to resume the incomplete co-browse session.

14. The system of claim 8, wherein the plurality of instructions further causes the system to determine a point in the intent configuration file at which the incomplete co-browse session was terminated; and
wherein to perform the one or more actions defined by the intent configuration file comprises to perform actions defined by the intent configuration file starting at the point in the intent configuration file at which the incomplete co-browse session was terminated.

15. The system of claim 8, wherein the plurality of instructions further causes the system to store the one or more actions performed by the chat bot during the resumed co-browse session to a co-browse action database.

16. One or more non-transitory machine readable storage media comprising a plurality of instructions stored thereon that, in response to execution by a system, causes the system to:
initiate an interaction between a user and a chat bot;
determine whether data indicative of an incomplete co-browse session is stored in association with a user in response to initiating the interaction between the user and the chat bot;
retrieve an intent configuration file associated with the incomplete co-browse session, wherein the intent configuration file defines a plurality of actions to be executed by the chat bot to resolve a user intent of the interaction between the user and the chat bot;
perform, via the chat bot and during a resumed co-browse session with the user, one or more actions of the plurality of actions defined by the intent configuration file that were not previously performed during the incomplete co-browse session; and
wherein the plurality of instructions further causes the system to generate the intent configuration file using machine learning based on an analysis of a plurality of co-browse sessions between users and contact center agents.

17. The one or more non-transitory machine readable storage media of claim 16, wherein the plurality of instructions further causes the system to provide, via the chat bot, the user with an option to resume the incomplete co-browse session; and wherein to retrieve the intent configuration file associated with the incomplete co-browse session is in response to receiving an indication that the user indicates to resume the incomplete co-browse session.

18. The one or more non-transitory machine readable storage media of claim 17, wherein the plurality of instructions further causes the system to determine a point in the intent configuration file at which the incomplete co-browse session was terminated; and
wherein to perform the one or more actions defined by the intent configuration file comprises to perform actions defined by the intent configuration file starting at the point in the intent configuration file at which the incomplete co-browse session was terminated.

19. The one or more non-transitory machine readable storage media of claim 17, wherein the plurality of instructions further causes the system to store the one or more actions performed by the chat bot during the resumed co-browse session to a co-browse action database.

\* \* \* \* \*